July 21, 1953

C. L. WETSEL 2,646,273

LOAD WEIGHT INDICATOR FOR CRANES

Filed Oct. 21, 1949

Inventor
Cecil L. Wetsel
By
ATTORNEYS

July 21, 1953 C. L. WETSEL 2,646,273
LOAD WEIGHT INDICATOR FOR CRANES
Filed Oct. 21, 1949 2 Sheets-Sheet 2
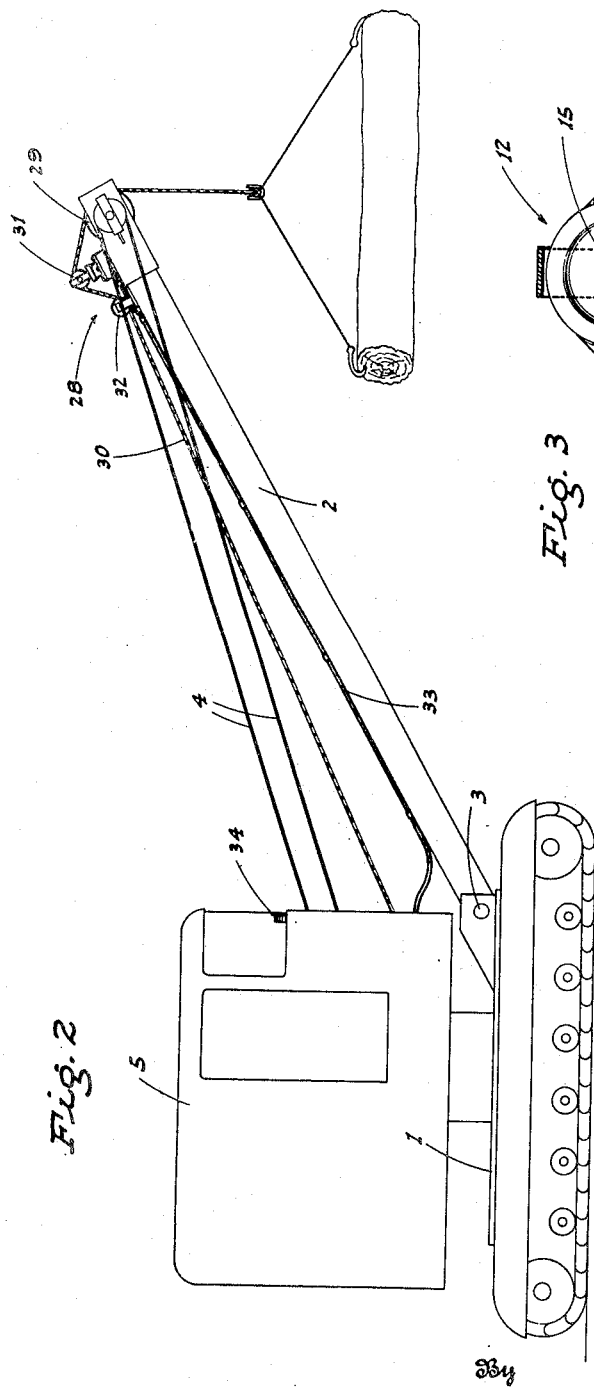
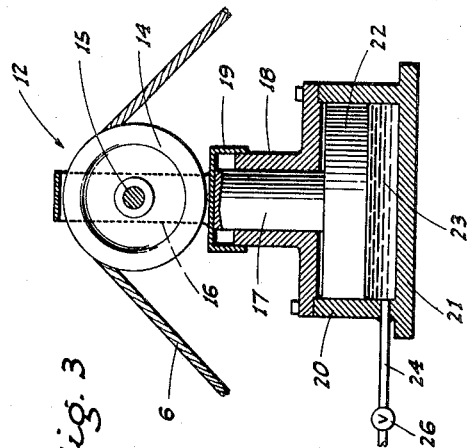
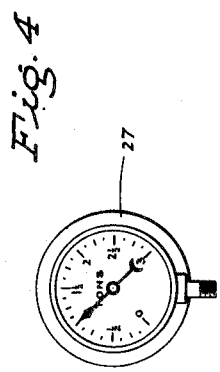
Inventor
Cecil L. Wetsel
By
Webster & Webster
ATTORNEYS Patented July 21, 1953

2,646,273

UNITED STATES PATENT OFFICE 2,646,273

LOAD WEIGHT INDICATOR FOR CRANES

Cecil L. Wetsel, Sacramento, Calif.

Application October 21, 1949, Serial No. 122,740

1 Claim. (Cl. 265—47)

This invention is directed to, and it is an object to provide, a novel device for indicating the weight of a load suspended from a crane; the invention being especially designed, but not limited, for use on a truck loading crane whereby the load placed on the truck is known and can be limited to the amount specified in safety and motor vehicle codes.

Another object of the invention is to provide a load weight indicator for cranes of the type which has a power actuated lift cable subjected to the weight of the suspended load; the device including a tension responsive unit cooperating with the cable without interfering with normal lengthwise motion thereof, and an indicator connected to such unit operative to reflect load imposed tension on the cable in terms of weight.

A further object of the invention is to provide a load weight indicator for cranes, as in the preceding paragraph, wherein the tension responsive unit creates fluid pressure proportionate to the load; said indicator being a fluid-pressure gauge connected to said unit and calibrated in terms of weight. This weight indicating gauge is mounted in a position within view of the crane operator.

An additional object of the invention is to provide a load weight indicator for cranes, which is simple in construction, being designed for ease and economy of manufacture.

It is also an object of the invention to provide a load weight indicator for cranes, which is of sturdy construction and arranged in a manner so that it is not subject to any substantial wear and tear during normal operation of the crane.

A further object of the invention is to provide a practical and reliable load weight indicator, and one which will be exceedingly effective for the purpose for which it is designed.

These objects are accomplished by means of such structure and relative arrangement of parts as will fully appear by a perusal of the following specification and claim.

In the drawings:

Fig. 2 is a similar view, but shows an alternate mounting of the fluid pressure creating unit.

Fig. 3 is an enlarged sectional elevation of the fluid pressure creating unit.

Fig. 4 is an enlarged face view of the fluid pressure gauge as calibrated in terms of weight.

Figure 1:
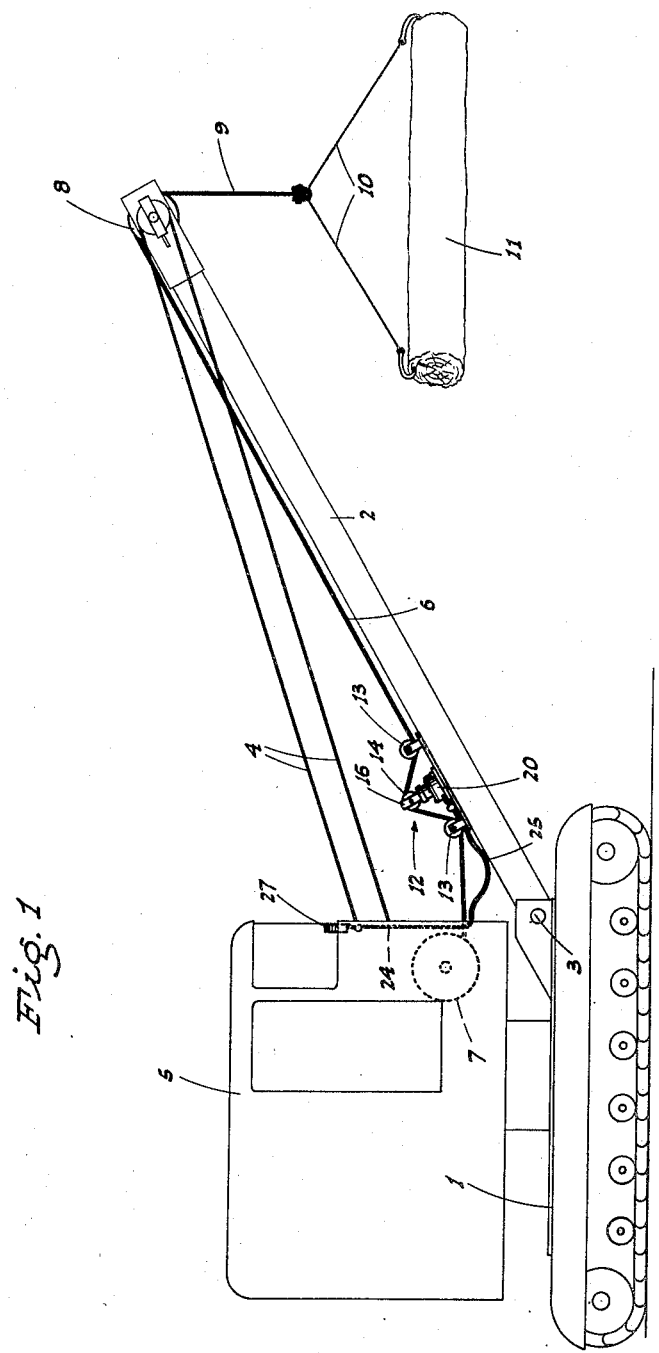
Fig. 1 is a side elevation of a portable industrial crane embodying the invention.

Referring now more particularly to the characters of reference on the drawings, and at present to Figs. 1, 3, and 4, the invention is here shown as embodied in a portable industrial crane which includes a track-supported body 1 having a forwardly projecting boom 2 pivoted, as at 3, to the body for vertical adjustment; such boom being controlled by a cable system 4 which leads rearwardly to a winch (not shown) in the cab 5 of the crane.

Additionally, the crane includes a lift cable 6 which extends along the boom 2 from a winch 7 in the cab 5; said winch 7—together with the winch which controls the cable system 4—being under the selective control of the operator.

Intermediate its ends the lift cable 6 turns over, and depends from, an outer end sheave 8 on the boom 2. The depending reach 9 of the lift cable 6 is adapted to be connected, as by a hook and suspension cable assembly 10, with the load, here shown as a log 11.

At a point intermediate the ends of the boom 2, the latter is fitted with a tension responsive, fluid pressure creating unit, indicated generally at 12.

A pair of spaced, direction-changing pulleys 13 are mounted on the boom 2 lengthwise thereof and with the fluid pressure creating unit 12 centrally therebetween.

Such fluid pressure creating unit 12 includes a laterally offset pulley 14 which engages the portion of the cable between the pulleys 13 and deflects said portion laterally out of its normal line of pull; the lift cable passing under both of the pulleys 13 and over the pulley 14. The result is that the pulley 14 is urged inwardly toward such normal line of pull when a load is imposed on the lift cable 6.

The pulley 14 is journaled by a shaft 15 in a yoke 16 secured to the outer end of an inwardly projecting plunger 17 which slidably engages in a neck 18; there being a protective cap 19 on the outer end of the plunger 17 encompassing the corresponding end of said neck 18.

The neck 18 is formed axially on one end of a short but relatively large-diameter cylinder 20 which includes a base 21 affixed to the boom 2.

At its inner end the plunger 17 is secured to a piston 22 which works in the cylinder 20; there being a quantity of fluid 23, preferably oil, in the cylinder 20 between the piston 22 and base 21.

A conduit 24 leads from the fluid chamber of the cylinder 20 rearwardly into the cab 5 of the crane; there being a flexible portion 25 in the conduit 24 between the boom 2 and cab 5 whereby the boom may work without interfering with the conduit arrangement. The conduit 24 includes a hand valve 26 which is normally open.

Within the cab 5 the conduit 24 connects to a fluid pressure gauge 27 calibrated in terms of weight. See Fig. 4.

When the crane is in use with a load, such as a log 11, suspended by the depending reach 9 of the lift cable 6, a tension is imposed on said cable by the load and such tension in turn acts to urge the pulley 14, plunger 17, and piston 22 inwardly. When this occurs the piston 22 exerts a proportionate pressure on the fluid 23, which pressure delivers through the conduit 24 to the gauge 27, where it is read in terms of weight. The calibration of the the gauge 27 is such that it reads accurately with respect to the suspended weight of the load. Thus, as each load is lifted by the crane, the operator can readily ascertain its weight, and if desired make a record thereof.

The device is extremely advantageous for many uses, as for example the loading of logging trucks wherein the truck must not be overloaded; i. e. the load must satisfy certain safety and motor vehicle regulations with respect to the maximum weight of such load.

With the present invention the crane operator can ascertain the weight of each part of the load as it it placed on the truck and readily compute the total.

It is also contemplated that the gauge 27 may be arranged so that it is of a cumulative type; i. e. to reflect the total weight of several load parts successively lifted by the crane.

In Fig. 2 the fluid pressure creating unit is indicated at 28, being of exactly the same construction as the unit 12, but mounted closely adjacent the free end of the boom; i. e. very close to the outer end sheave 29. Here the lift cable 30 runs directly from the outer end sheave 29 over the cable deflecting pulley 31 of the unit 28, and thence extends inwardly to pass under a direction control pulley 32.

With this arrangement one less pulley is required than in the embodiment of Fig. 1, although the fluid presure conduit 33 must be elongated, extending from the fluid pressure creating unit 28 for substantially the full length of the boom, and thence traversing into the cab for connection to the gauge 34.

The device, in this embodiment, works in exactly the same manner as heretofore described.

The load weight indicator in either of its embodiments provides a very practical, reliable, and convenient device for the indication, automatically, of each load lifted by the crane.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

A load-weight indicator for a crane, said crane including a boom, a sheave at the outer end of the boom and a lift cable extending along the boom to and depending about the sheave; the indicator comprising, in combination with said sheave, a pulley on the boom relatively close to but spaced along the boom from the sheave and under which the cable passes, a fluid pressure unit mounted on the boom between the pulley and sheave and including a fluid contacting plunger movable laterally of the cable and a pulley on the plunger engaging and deflecting the cable from a normal straight line of pull between the first named pulley and the sheave; increased tension on the cable acting to shift the plunger in a direction to increase the fluid pressure in the unit, there being a weight indicating gauge actuated by such pressure increase.

CECIL L. WETSEL.

References Cited in the file of this patent

UNITED STATES PATENTS

| Number | Name | Date |
|---|---|---|
| 1,779,656 | Brauer | Oct. 28, 1930 |
| 1,780,238 | Lincoln | Nov. 4, 1930 |
| 1,872,087 | Martin | Aug. 16, 1932 |
| 2,030,529 | Nash | Feb. 11, 1936 |
| 2,324,769 | Davis | July 20, 1943 |
| 2,488,070 | Spalding | Nov. 15, 1949 |

FOREIGN PATENTS

| Number | Country | Date |
|---|---|---|
| 311,714 | England | May 15, 1929 |